Nov. 30, 1965     C. W. BIRDSONG     3,220,656
VALVE FOR MIXING HOT AND COLD WATER WITH SOAP
IN VARIOUS PROPORTIONS
Filed April 2, 1963     3 Sheets-Sheet 1
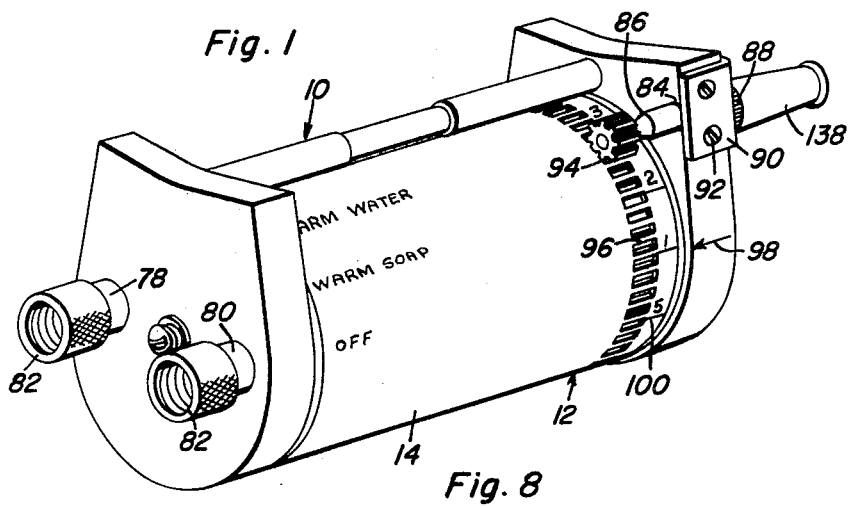
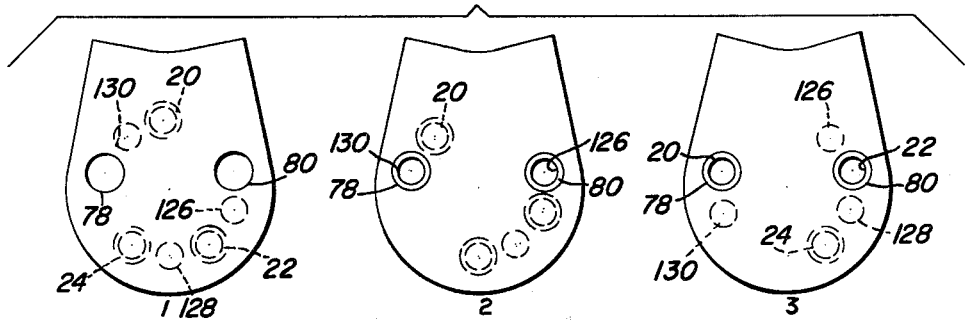
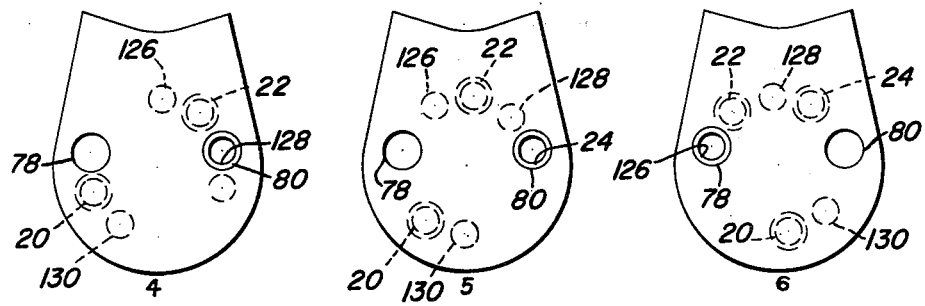
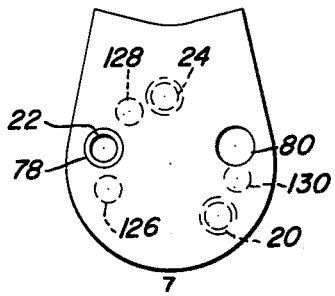
Charles W. Birdsong
         INVENTOR.
BY *Lawrence A. O'Brien*
*and Harvey B. Jacobson*
                    Attorneys Nov. 30, 1965                    C. W. BIRDSONG                    3,220,656
         VALVE FOR MIXING HOT AND COLD WATER WITH SOAP
                       IN VARIOUS PROPORTIONS
Filed April 2, 1963                                    3 Sheets-Sheet 2
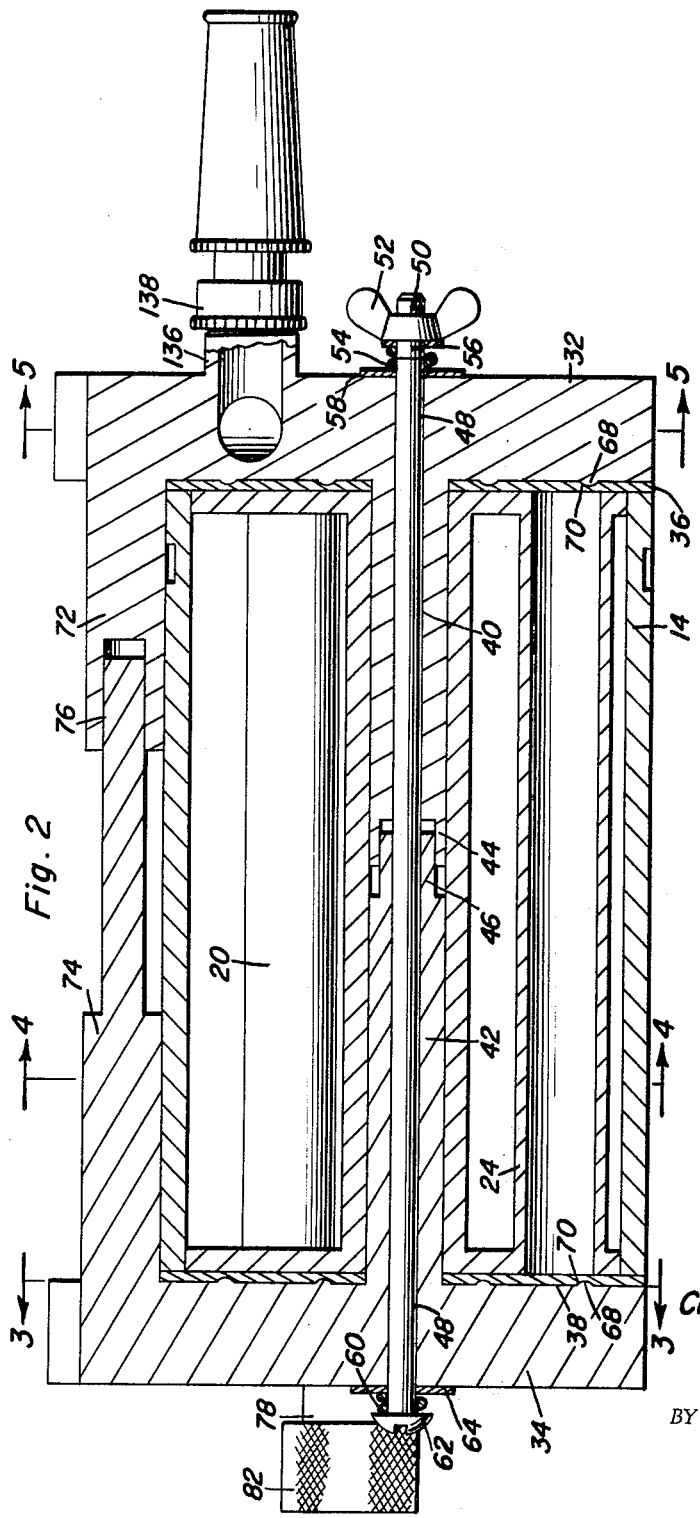
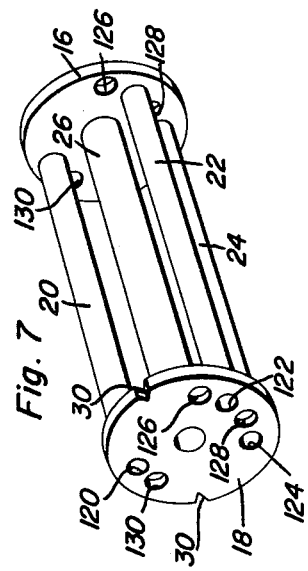
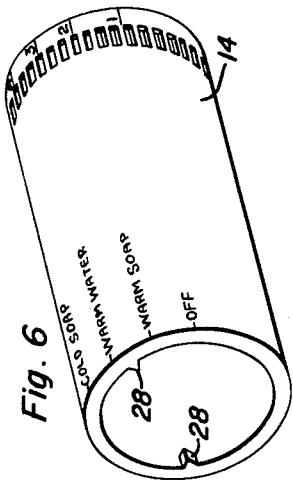
Charles W. Birdsong
         INVENTOR.

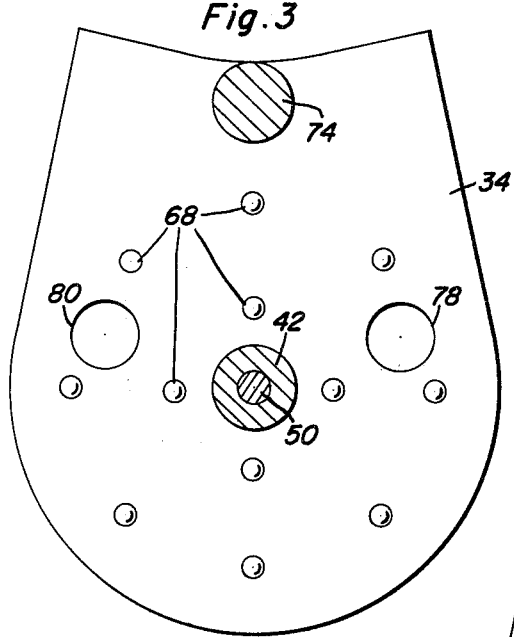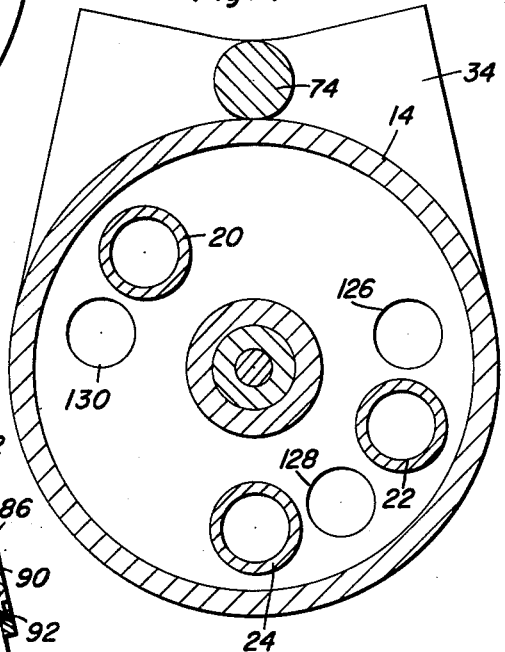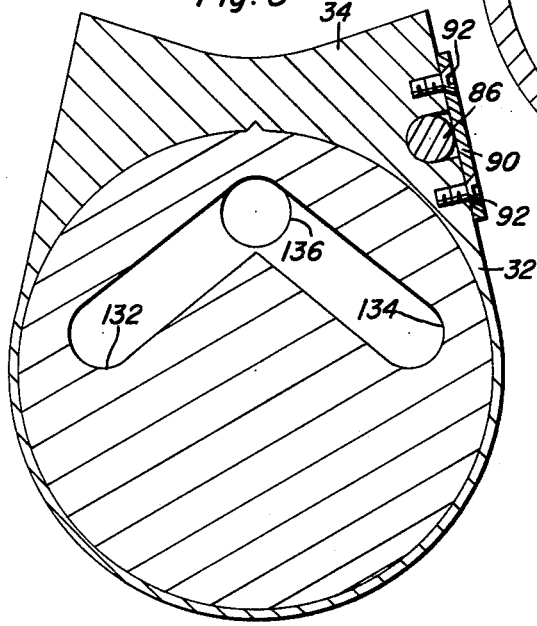

United States Patent Office 3,220,656
Patented Nov. 30, 1965

3,220,656
VALVE FOR MIXING HOT AND COLD WATER
WITH SOAP IN VARIOUS PROPORTIONS
Charles W. Birdsong, Gumberry, N.C.
(Star Rte., Box 125, Roanoke Rapids, N.C.)
Filed Apr. 2, 1963, Ser. No. 270,082
9 Claims. (Cl. 239—315)

This invention relates to a novel and useful valve and more specifically to a valve assembly primarily designed for mixing hot and/or cold water with soap and for dispensing either hot and/or cold water alone as well as hot and/or cold water mixed with soap.

The mixing valve or valve assembly of the instant invention includes an elongated housing which comprises a tubular member defining a soap reservoir and the tubular member is provided with removable end walls interconnected by means of water tubes. The end walls are also interconnected by means of a central tube and each of the water tubes as well as the central tube extends through the end walls of the tubular member. A pair of outer end walls are secured over the end walls of the tubular member interconnected by means of the center and water tubes and the outer end walls are secured together against relative rotation and for rotation relative to the tubular member. The end walls of the tubular member interconnected by the water tubes are also provided with openings and all of the openings and water tubes are disposed in a circle whose center is defined by the center tube which interconnects the end walls of the tubular member and the axis of rotation of the tubular member relative to the outer end walls of the valve assembly. The outer end walls of the tubular member are provided with hot and cold inlets and outlets and the various openings and water tubes formed in the end walls of the tubular member interconnected by means of the water tubes are registrable with various ones of the water inlet and outlets formed in the outer end walls of the tubular member thereby enabling hot and/or cold water to be dispensed from the outlet of the valve assembly either plain or mixed with soap. In this manner, the valve assembly, which includes a single movable valve member defined by the tubular member and its end walls, may be utilized to dispense warm soapy water, warm water without soap, cold soapy water, cold water without soap, hot soapy water and hot water without soap.

The main object of this invention is to provide a mixing valve or valve assembly which may be readily attached to the outlet ends of a pair of flexible hot and cold water hoses and utilized to dispense hot and/or cold water either plain or mixed with soap.

A further object of this invention, in accordance with the immediately preceding object, is to provide a valve assembly having a single actuator for moving the single valve member thereof thereby enabling the valve assembly to be operated with ease.

A still further object of this invention is to provide a valve assembly constructed in a manner whereby it may be readily transported from one location to another.

A further object of this invention is to provide a valve assembly having means thereon whereby the condition of the water to be dispensed thereby may be readily ascertained by the position of the movable valve member.

A final object of this invention to be specifically enumerated herein is to provide a valve assembly in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the valve assembly;

FIGURE 2 is a longitudinal sectional view of the valve assembly on somewhat of an enlarged scale and taken substantially upon a plane passing through the longitudinal centerline of the valve assembly;

FIGURE 3 is a transverse vertical sectional view taken substantially upon the plane indicated by the section line 3—3 of FIGURE 2;

FIGURE 4 is a transverse vertical sectional view taken substantially upon the plane indicated by the section line 4—4 of FIGURE 2;

FIGURE 5 is a transverse vertical sectional view taken substantially upon the plane indicated by section line 5—5 of FIGURE 2;

FIGURE 6 is a perspective view of the tubular member of the valve assembly;

FIGURE 7 is a perspective view of the end walls of the tubular member which are shown interconnected by means of a plurality of water tubes and a single centrally disposed tube; and FIGURE 8 is a plurality of diagrammatic views showing the manner in which the single movable actuator of the valve assembly may be manipulated to dispense various combinations of either hot and cold water separately or together and with or without soap.

Referring now more specifically to the drawings the numeral 10 generally designates the valve assembly of the instant invention which includes a housing generally referred to by the reference numeral 12. The housing 12 comprises a tubular member 14 which has separable end walls 16 and 18 that are interconnected by means of a plurality of water tubes 20, 22 and 24. In addition, a centrally disposed tube 26 is also utilized to interconnect the end walls 16 and 18. It may further be seen from FIGURE 7 of the drawings that each of the central and water tubes opens through the remote ends of the end walls 16 and 18.

From a comparison of FIGURES 6 and 7 of the drawings it may be seen that the tubular member 14 is provided with a pair of inwardly projecting detents 28 which are receivable in the radial notches 30 formed in the end wall 18 whereby the end walls 16 and 18 are locked to the tubular member 14 for rotation therewith.

The valve assembly 10 also includes a pair of outer end walls 32 and 34 and it may be seen from FIGURE 2 of the drawings that the outer end walls 32 and 34 are disposed over the outer surfaces of the end walls 16 and 18 respectively after a pair of sealing disks 36 and 38 are interposed between the end walls 16 and 32 and the end walls 18 and 34 respectively.

The end walls 32 and 34 include centrally disposed axle portions 40 and 42 respectively which project toward each other and are provided with notched end portions 44 and 46 that are interlockingly engaged with each other to prevent relative rotation between the end walls 16 and 18. Each of the axle portions 40 and 42 has a bore 48 formed longitudinally therethrough which opens outwardly of the outer surface of the corresponding outer end wall and an elongated fastener 50 is secured through the bores 48 by means of a threaded wing nut 52. A compression spring 54 is disposed between a pair of washers 56 and 58 carried by the fastener 50 and interposed between the outer surface of the end wall 32 and the threaded wing nut 52. In addition, a compression spring 60 is interposed between the diametrically enlarged head of the fastener 50 remote from the threaded wing nut 52 and a washer 64 bearing against the outer surface of the outer end wall 34.

It may be seen from FIGURE 2 of the drawings that the inner face of each of the outer end walls 32 and 34 is provided with a plurality of projections 68 which are receivable in the recesses 70 formed in the confronting surfaces of the disks 36.

The outer end walls 32 and 34 are provided with handle sections 72 and 74 which project toward each other from portions of the outer end walls 32 and 34 which project beyond one side of the tubular member 14 and the confronting ends of the handle sections 72 and 74 are telescopingly engaged as at 76.

From FIGURE 1 of the drawings it may be seen that the outer end wall 34 is provided with a hot water inlet 78 and a cold water inlet 80. The inlets 78 and 80 are provided with threaded coupling members 82 whereby the inlets 78 and 80 may be readily connected to the ends of flexible hoses.

The outer end wall 32 has a notch 84 formed therein in which a control shaft 86 is rotatably journaled. One end of the control shaft 86 is provided with a control knob 88 and it may be seen that a retaining plate 90 is secured over the outer end of the notch 84 by means of suitable fasteners 92 to prevent unwanted removal of the control shaft 86. The end of the control shaft 86 remote from the knob 88 has a gear wheel 94 mounted thereon for rotation therewith and the gear wheel 94 is meshed with gear teeth 96 formed in the corresponding end of the tubular member 14. In addition, an indicator 98 is formed on the side edge of the end wall 32 and is registrable with indicia 100 carried by the adjacent portion of the tubular member 14.

With attention now directed to FIGURE 7 of the drawings it may be seen that the water tubes 20, 22 and 24 open through the end walls 18 and 16 at 120, 122 and 124. In addition, the end walls 16 and 18 are each provided with openings 126, 128 and 130.

From FIGURE 5 of the drawings it may be seen that the hot water outlet 132 and the cold water outlet 134 formed in the outer end wall 32 converge together at a single outlet 136 which in turn has an outlet nozzle 138 secured thereto which is similar to a water hose nozzle and may be utilized to effect various types of spray patterns with the water being dispensed or discharged from the mixing valve 10. In addition, the flow of water from the mixing valve 10 may be terminated by closing the nozzle 138.

With attention now directed to FIGURE 8 of the drawings, it may be seen that the hot and cold water inlets 78 and 80 respectively are completely out of registry with all of the openings and the water tubes which open through the adjacent end wall 18. Accordingly, the tubular member 14 is diagrammatically illustrated as being in the "off" position preventing the entrance of either hot or cold water into the tubular member. However, in the position of the tubular member 14 designated in illustration 2, the opening 130 has been moved into registry with the hot water inlet 78 whereupon hot water passes through the soap reservoir defined between the end walls 16 and 18 thus effecting the discharge of hot water outwardly of the nozzle 138. In addition, it will be noted that the opening 126 has also been moved into registry with the cold water inlet 80 thereby enabling the circulation of cold water through the soap reservoir resulting in warm soapy water being discharged from the nozzle 138.

With attention now directed to illustration 3 of FIGURE 8, it will be noted that the water tube 20 has been moved into registry with the hot water inlet 78 and that the water tube 22 has been moved into registry with the cold water inlet 80. Thus, both hot and cold water are passed through the tubular member 14 without being communicated with the interior of the soap reservoir resulting in warm water without soap being discharged from the nozzle 138.

In illustration 4 of FIGURE 8, it may be seen that all of the openings and tubes have been moved out of registry with the hot water inlet 78 and that the opening 128 has been moved into registry with the cold water inlet 80 resulting in the circulation of cold water through the soap reservoir defined between the end walls 16 and 18 and the discharge of cold soapy water from the nozzle 138. In illustration 5, it may be seen that the water tube 24 has been moved into registry with the cold water inlet 80 while the openings and tubes still remain out of registry with the hot water inlet 78 thus resulting in the passage of cold water straight through the tubular member 14 without entering the soap reservoir and thus the discharge of cold water out of the nozzle 138.

In illustration 6 it may be seen that the opening 126 has been moved into registry with the hot water inlet 78 and that none of the water tubes or openings are in registry with the cold water inlet 80. Thus, hot soapy water is discharged from the nozzle 138. Finally, in illustration 7, the water tube 22 has been moved into registry with the hot water inlet 78 while still maintaining the cold water inlet 80 out of registry with the openings and water tubes thereby resulting in the passage of hot water straight through the tubular member 14 without its entering the soap reservoir defined between the end walls 16 and 18 and the discharge of hot water out of the nozzle 138.

The control knob 88 is of course to be utilized in order to rotate the tubular member 14 from the end walls 16 and 18 relative to the outer end walls 32 and 34. By means of this simple control knob 88, movement of the single movable valve member comprising the tubular member 14 may be accomplished thereby enabling either cold water or hot water alone or with soap added to be discharged from the nozzle 138 as well as either warm water alone or with soap added.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A valve assembly for mixing hot and/or cold water with soap, said assembly comprising a housing including separate cold and hot water inlets and separate cold and hot water outlets, said housing also including a soap reservoir and a single valve member movably supported from said housing and including passage means coacting with said inlets, said reservoir, and said outlets and operable, upon selective movement of said valve member to simultaneously and/or individually directly communicate said inlets with said outlets independently of said reservoir and selectively simultaneously and/or individually communicate said inlets with said outlets by way of said soap reservoir.

2. A valve assembly for mixing hot and/or cold water with soap, said assembly comprising a housing including cold and hot water inlets and outlets, said housing including a soap reservoir and movable valve means for selectively simultaneously and individually directly communicating with said inlets with said outlets and selectively simultaneously and individually communicating said inlets with said outlets by way of said soap reservoir, said housing comprising a tubular member including opposite end walls and defining said soap reservoir, each of said end walls having a plurality of openings formed therethrough and said tubular member having a plurality of tubes secured therethrough and sealed from the interior of said reservoir, a pair of outer end walls, means securing said outer end walls together and rotatably supporting said tubular member therebetween with the outer faces of the first mentioned end walls disposed in sliding contact with the inner surfaces of said outer end walls, said inlets being formed in one of said outer end walls and said outlets being formed in the other of said outer end walls, said openings and the opposite ends of said tubes being selectively registrable with corresponding ones of said inlets and outlets.

3. The combination of claim 2 wherein said valve assembly includes co-acting means carried by said tubular member and one of said outer end walls for effecting rotation of said movable valve means to any one of a plurality of predetermined positions.

4. A valve assembly for mixing hot and/or cold water with soap, said assembly comprising a housing including cold and hot water inlets and outlets, said housing including a soap reservoir and movable valve means for selectively simultaneously and individually directly communicating with said inlets with said outlets and selectively simultaneously and individually communicating said inlets with said outlets by way of said soap reservoir, said housing comprising a tubular member including opposite end walls and defining said soap reservoir, each of said end walls having a plurality of openings formed therethrough and said tubular member having a plurality of tubes secured therethrough and sealed from the interior of said reservoir, a pair of outer end walls, means securing said outer end walls together and rotatably supporting said tubular member therebetween with the outer faces of the first mentioned end walls disposed in sliding contact with the inner surfaces of said outer end walls, said inlets being formed in one of said outer end walls and said outlets being formed in the other of said outer end walls, said openings and the opposite ends of said tubes being selectively registrable with corresponding ones of said inlets and outlets, said tubular member end walls being receivable in the opposite ends of said tubular member and secured together by means of said tubes, a central tube secured between and through said tubular member end walls, an elongated fastener secured through said central tube and the outer end walls of said assembly and resiliently urging said outer end walls together, and sealing disks disposed between corresponding pairs of said end walls forming a fluid tight seal therebetween.

5. The combination of claim 4 wherein the opposing faces of said outer end walls and the corresponding sealing disk have cooperating means for preventing rotation of said disks relative to said outer end walls.

6. The combination of claim 5 including means interconnecting said outer end walls against rotation relative to each other comprising a part of said means rotatably supporting said tubular member between said outer end walls.

7. The combination of claim 1 wherein said outlets converge into a single outlet nozzle.

8. A valve assembly for mixing hot and/or cold water with soap, said assembly comprising a housing including cold and hot water inlets and outlets, said housing including a soap reservoir and movable valve means selectively operable to simultaneously and individually directly communicate said inlets with said outlets and selectively simultaneously and individually communicate said inlets with said outlets by way of said soap reservoir, said housing including remote end walls and defining a soap reservoir, each of said end walls having a plurality of openings formed therethorugh and said housing having a plurality of tubes secured therethrough and sealed from the interior of said reservoir, a pair of outer end walls, means securing said outer end walls together and rotatably supporting said housing therebetween with the outer faces of the first mentioned end walls disposed in sliding contact with the inner surfaces of said outer end walls, said inlets being formed in one of said outer end walls and said outlets being formed in the other of said outer end walls, said openings and the opposite ends of said tubes being selectively registrable with corresponding ones of said inlets and outlets.

9. A valve assembly for mixing hot and/or cold water with soap, said assembly comprising a housing including cold and hot water inlets and outlets, said housing including a soap reservoir and movable valve means selectively operable to simultaneously and individually directly communicate said inlets with said outlets and selectively simultaneously and individually communicate said inlets with said outlets by way of said soap reservoir, said housing including remote end walls and defining said soap reservoir, each of said end walls having a plurality of openings formed therethrough and said housing having a plurality of tubes secured therethrough and sealed from the interior of said reservoir, a pair of outer end walls, means securing said outer end walls together and rotatably supporting said housing therebetween, said inlets being formed in one of said outer end walls and said outlets being formed in the other of said outer end walls, said openings in the opposite ends of said tubes being selectively registrable with corresponding ones of said inlets and outlets, and means defining fluid-tight seals between said outer end walls and said end walls of said housing.

References Cited by the Examiner

UNITED STATES PATENTS

| 2,120,807 | 6/1938 | Kundel. | |
| 2,211,007 | 8/1940 | Funk | 137—625.29 XR |
| 2,708,599 | 5/1955 | Grikscheit | 239—315 |
| 3,075,557 | 1/1963 | Kuriluk | 239—317 XR |

FOREIGN PATENTS

| 574,685 | 4/1959 | Canada. |

M. CARY NELSON, *Primary Examiner.*